United States Patent [19]

Hildebrandt

[11] 4,386,010

[45] May 31, 1983

[54] TREATED ATTAPULGITE CLAY COMPOSITION

[75] Inventor: Steven J. Hildebrandt, Kendall Park, N.J.

[73] Assignee: Engelhard Corporation, Edison, N.J.

[21] Appl. No.: 326,720

[22] Filed: Dec. 2, 1981

Related U.S. Application Data

[63] Continuation of Ser. No. 183,619, Sep. 2, 1980, abandoned.

[51] Int. Cl.$^3$ .............................................. B01J 31/02
[52] U.S. Cl. .................................... 252/428; 252/430; 210/502
[58] Field of Search ........... 252/428, 430, 437, 455 R; 210/679, 680, 685, 686, 687, 688, 690, 691, 502

[56] References Cited

U.S. PATENT DOCUMENTS

| 2,367,384 | 1/1945 | Tymstra | 210/680 |
| 2,797,196 | 6/1957 | Dunn et al. | 252/8.5 M |
| 2,885,360 | 5/1959 | Haden | 252/8.5 M |
| 3,677,939 | 7/1972 | Patil | 210/679 |
| 4,033,764 | 7/1977 | Colegate et al. | 210/679 |
| 4,079,001 | 3/1978 | Haase | 210/679 |
| 4,167,481 | 9/1979 | Cremers | 210/679 |

FOREIGN PATENT DOCUMENTS 54-113956 9/1979 Japan .

OTHER PUBLICATIONS

Cowan, "Adsorption by Organo-Clay Complexes," Clays and Clay Minerals, vol. 9, pp. 459–467, 1960.
McCarter, "Thermal Activation of Attapulgus Clay," Industrial and Engineering Chemistry, vol. 42, pp. 529–533, 1950.
Martin, "Selection Criteria for Commercial Activated Carbons in Wastewater Treatment," Abstract from American Chemical Society, 178th National Meeting, Washington, D.C., Sep. 9–14, 1979.
Hassler, Purification with Activated Carbon, Chemical Publishing Co., Inc., NY, 52–62.

Primary Examiner—Ernest G. Therkorn
Attorney, Agent, or Firm—Inez L. Moselle

[57] ABSTRACT

Attapulgus clay rendered substantially non-swelling and non-gelling by calcination is treated with a large organophilic quaternary ammonium or phosphonium compound to yield a sorbent material effective for purifying liquids from inorganic and organic contaminants. Treatment of the mineral substrate may be accomplished by mixing in a liquid system or by spraying a solution of the quaternary ammonium surfactant onto the mineral. Surfactant on the mineral is present in quantities approximating the exchange capacity of the mineral.

3 Claims, No Drawings

TREATED ATTAPULGITE CLAY COMPOSITION

This application is a continuation of application Ser. No. 183,619, filed Sept. 2, 1980, now abandoned.

BACKGROUND OF THE INVENTION

1. Field of the Invention

This invention relates to compositions of aluminosilicate minerals treated with large organophilic cationic surfactants such as quaternary ammonium or phosphonium compounds and a method for purifying liquids therewith.

2. Prior Art

Many industries produce large quantities of process liquids that must be purified of contaminants prior to further processing, sale, recycle or disposal. In treating aqueous systems for removal of contaminants, various grades of activated carbon or bone char impregnated with activated carbon have been widely used. Not all grades perform well in all uses, and the more effective grades tend to be rather expensive. Economic benefits could be realized by using mineral-based sorbents, but unmodified mineral sorbents do not perform well in aqueous systems, though they are known purifying agents for organic liquids, notably fats and oils. For example, fuller's earth has been a known purifying agent and decolorizer for fats and oils since antiquity.

It has been recognized that mineral substrates may be modified to obtain a more organophilic surface to be effective sorbents for certain uses. A relatively high surface area and a cationic exchange capacity above about 5 milliequivalents per 100 grams of sorbent is desirable. Exemplary mineral substrates are sepiolite, attapulgite (palygorskite) and smectites. In their naturally occurring state many of these clay minerals (aluminosilicates) swell or slake in aqueous systems resulting in gel formation or colloidal dispersions that are extremely difficult to separate from the liquid. Granular forms of these clays in naturally occurring state or condition would simply fall apart in aqueous media. Some sorptive minerals such as bauxite do not exhibit this deficiency. Clays may be rendered substantially non-gelling or non-slaking by heat treatment. By way of example attapulgite clay calcined at temperatures in the range 200°–550° C. is rendered non-gelling and non-slaking thereby. Reference is made to W. S. W. McCarter et al, "THERMAL ACTIVATION OF ATTAPULGUS CLAY", Industrial and Engineering Chemistry, vol. 42, pages 529–533, 1950. This treatment alone is not sufficient for the mineral to effectively remove contaminants from many contaminated aqueous liquids.

Surface modification to make the mineral surface more organophilic by placing an organic-substituted amine or quaternary ammonium compound thereon is known. The great bulk of these compositions are used in thickening and related arts and require a swelling or gelling-grade clay, e.g. montmorillonite, bentonite, hectorite and other smectites as well as attapulgite and sepiolite. In some instances these materials have shown utility as sorbents for organic molecules in aqueous systems. Reference is made to C. T. Cowan et al, "ADSORPTION BY ORGANOCLAY COMPLEXES", Clays and Clay Minerals, vol. 9, pages 459–467, 1960. Difficulties in handling these materials would preclude their use in large-scale treatment of process liquors. U.S. Pat. No. 4,167,481 to Cremers et al discloses effective removal of metal cations from wastewater by addition of certain polyamines in the presence of a cation exchanger such as natural bentonites, montmorillonites and zeolites. The metal cation is complexed by the amine and subsequently adsorbed on the aluminosilicate material.

Quaternary-treated gelling grade attapulgite is also known. Reference is made to U.S. Pat. No. 2,797,196 to Dunn and U.S. Pat. No. 2,885,360 to Haden et al, in which the treated clay is used as a thickening agent for various organic liquids.

Unmodified, heat-treated attapulgite has disclosed use in water treatment for removing certain metal cations, hormones, toxins, viral micro-organisms and pesticides. Reference is made to the following U.S. Patents to Sawyer: U.S. Pat. Nos. 4,054,515; 4,116,825; 4,116,826; 4,116,827; 4,116,828. A specially processed form of heat-treated attapulgite has disclosed use as a filter aid in U.S. Pat. No. Re. 25,464 (Oct. 15, 1963) of U.S. Pat. No. 3,080,214. A method of preparing heat-treated, so-called "activated" attapulgite which is substantially non-gelling and non-slaking is disclosed in U.S. Pat. No. 3,041,238 to Allegrini.

Heat-treated attapulgite modified by addition of amines has found use as a toxicant carrier as disclosed in U.S. Pat. No. 3,024,164 to Sawyer and as an anti-caking agent disclosed in U.S. Pat. No. 3,234,003 to Sawyer et al.

None of the above-mentioned references teaches either heat-treated non-gelling grades of attapulgite or non-gelling grades of smectite clays modified by ion exchange with an organic-substituted quaternary ammonium or phosphonium compound or the use thereof in purification of liquids, especially aqueous liquids.

An object of the present invention is to modify a sorptive mineral substrate to make it effective in purifying liquids in which activated carbon has been virtually the sole viable sorbent.

Another object of the invention is a method of purifying, decolorizing and/or removing dissolved inorganic and organic contaminants including colloidal size color bodies from aqueous liquid systems.

THE INVENTION

I have discovered that porous mineral substrates treated with organic-substituted quaternary ammonium or phosphonium compounds are effective sorbents for the purification of a variety of aqueous liquids. By contacting contaminated liquids with the surfactant treated mineral a major portion of the contaminant may be removed. Thus, the present invention also provides a process for removing organic and inorganic contaminants from liquids which comprises treating the solution with particles of a porous mineral and quaternary ammonium or phosphonium compound.

In the process of removing contaminants from liquids, treating the mineral substrate with the quaternary ammonium salt and then contacting the treated mineral with the contaminated liquid is preferred. As an alternative, both the mineral and the quaternary ammonium salt may be added separately to the contaminated liquid. These methods may be employed in batch or continuous processes. In either case, it is essential that the mineral be non-slaking or non-gelling, and of particle size sufficiently large so that it is easily filtered or separated from the liquid by settling, centrifugation or other methods known in the art. Exemplary minerals are high-calcium bentonites, acid-activated bentonites and calcined or heat-treated grades of attapulgite, with the temperatures of heat treatment generally above about 150° C. The mineral may be in powdered or granular form. The quaternary ammonium compounds must be water or alcohol soluble. Exemplary organic-substituted quaternary ammonium or phosphonium compounds are those containing at least one alkyl group having at least four carbon atoms. Any of the well-known anions such as chloride, bromide, nitrate, hydroxyl, acetate, or methyl sulfate may be used.

By practice of this invention it is possible to remove color bodies and other contaminants from some aqueous liquids more cost-effectively than by using activated carbon. In some instances the performance of compositions of the present invention may be superior on a weight basis to activated carbon. Exemplary among the liquid systems to be treated are various aqueous process liquors such as cane sugar liquor, waste-water and the like.

In another embodiment of the invention the treated mineral may be useful as a filter aid in applications where enhanced removal of suspended solids is desired.

DESCRIPTION OF THE PREFERRED EMBODIMENTS

The preferred non-gelling grade mineral used in practice of my invention is a calcined attapulgite clay, also known as Attapulgus clay or Georgia-Florida fuller's earth, which is composed principally of the mineral attapulgite, but which also may contain significant amounts of mineral impurities such as montmorillonite, quartz (silica) and feldspar, and in some cases sepiolite. As mined the mineral is associated with substantial water, both loosely held "free moisture" (F.M.) and chemically combined water which is an integral part of the crystal lattice. Combined water is less readily removed than the physically held water and ordinarily requires a temperature of at least about 300° C. for at least partial removal, this being called "activation". Volatile-free weight is the weight of the earth after heating to essentially constant weight at about 660° C. Loss on ignition weight is determined by heating to constant weight at about 1000° C. At this temperature carbon dioxide volatile matter from any carbonate impurities in the clay is removed and may comprise typically about 4–7% by weight of the clay. Removal of combined water is substantially irreversible whereas physical water loss is reversible.

The term free moisture or F.M. as used herein refers to the weight percent of the mineral eliminated when heated to constant weight at about 105° C. The term volatile matter or V.M. as used herein refers to the weight percent of the mineral eliminated when heated to constant weight at 660° C. less the F.M. Volatile matter then is approximately equivalent to lattice water, and free moisture is equivalent to physically held water. In general, it may be said that attapulgite calcined to a V.M. of 10% or less is activated and has at least partial loss of colloidal properties. Since physically bonded water is picked up by the attapulgite after calcination the F.M. content of the calcined product as produced will be less than that of the same material after storage in a humid environment or during handling. The clay may be calcined by means conventional in the art, for example a rotary calciner. Calcination temperature should be in the range of about 200°–550° C. with temperatures of 450°–550° C. being especially preferred. The lower temperature calcination gives rise to an attapulgite having volatile matter of about 10% and a free moisture content of about 6% and is called an RVM-grade clay. The higher and preferred temperature range calcination gives rise to an attapulgite known as an LVM-grade clay of very low volatile matter of about 5% and a free moisture content of about 0.2% as produced. The F.M. is more typically about 1–3% after handling, as the mineral readily absorbs moisture from the atmosphere. The heat-treated attapulgites have a surface area of about 80–140 m.$^2$/g. as determined by standard B.E.T. method using nitrogen, a pore volume of about 0.5 to 0.8 cc./g., and a cationic exchange capacity in the range 10–40 meq./100 g., generally about 15–30 meq./100 g. clay. For a good mineral sorbent for use in the present invention it is preferred to have a cationic exchange capacity of at least 5 meq./100 g. and a surface area of at least 30 m.$^2$/g. and preferably greater than 80 m.$^2$/g.

It is preferred to have the ultimate particle size of the mineral substrate greater than about 2 microns when powdered grades are used. Ultimate particle size is understood to mean the size of particles in completely dispersed form. It is especially preferred to have no more than about 20% of the particles finer than 1 micron for ease in filtration. When granular particles are used a particle size optimum for the process application is recommended.

It is recognized in the art that a clear distinction between a granular size and a powder may not be made precisely. Granular sizes are understood herein to mean those in excess of about 60 mesh Tyler, and powder is understood to mean particles finer than about 200 mesh Tyler.

Of the wide variety of surface active organic-substituted quaternary ammonium salts available, one with at least one organic group of saturated or unsaturated straight, branched or cyclic chain length greater than four carbon atoms, should be chosen. It is preferred to have the chain length of this group greater than about 12 carbon atoms. The tallow group (16–18 carbon atoms) is especially preferred. As mentioned previously any of the well known anions may be used, with chloride, acetate and methyl sulfate preferred.

The following quaternary ammonium salts have been discovered to have utility in practice of the invention, trade names being indicated where appropriate: tallowammonium acetate (Armac ®T), cocotrimethylammonium chloride (Adogen ®461), tallow trimethylammonium chloride (Arquad ®T-50), trimethylhexadecylammonium chloride (Arquad 16-50), cetyltrimethylammonium bromide, benzyltrimethylammonium chloride (Variquat ®B-200), dimethyl dicocoammonium chloride (Arquad 2C-75), dimethyldi(hydrogenated tallow)ammonium chloride (Arquad 2HT-75), methyl-tri($C_8$-$C_{10}$)ammonium chloride (Adogen 464), tetrapropylammonium chloride monohydrate, dimethyltallowbenzylammonium chloride (Kemamine ®BQ-9742-C), methylbis(2-hydroxyethyl)octadecylammonium chloride (Ethoquad ®18/12), N,N,N',N',N'-pentamethyl-N-tallow-1,3-propanediammonium chloride (Duoquad ®T-50), 1-ethylene-bis(2-tallow, 1-methyl, imidazolinium methyl sulfate), (Varisoft ®6112), methyl-1-tallow-amidoethyl-2-tallowimidazolinium methyl sulfate (Varisoft 475).

One skilled in the art may determine by routine experimentation which quaternary ammonium salts are the most effective in a given application and what loading levels are optimum. In general, light loading levels are effective with lightly contaminated liquids; heavier loadings are required for strongly contaminated liquids. Surfactant loading levels will also depend on the mineral substrate used. For the preferred mineral substrate of the present invention, viz. a low volatile matter heat-treated attapulgite clay, about 5-50 meq. of quaternary ammonium salt/100 g. clay is preferred. An amount virtually equal to the cation exchange capacity of the mineral or about 30 meq. quaternary compound/100 g. clay is especially preferred. On a weight basis 50 meq./100 g. clay is approximately 15% by weight for a surfactant of molecular weight 300 and 30% by weight for one of 600, the range in molecular weights being illustrative of surfactants of the present invention. Higher levels may be put on, but this increases the amount of surfactant that might be leached off in use. The efficiency of removal and the cost of materials are other factors to be considered in optimizing the ratio of clay and surfactant.

Regarding the order of addition of quaternary ammonium salt and mineral, various embodiments are possible.

In a first embodiment, the quaternary ammonium salt and mineral substrate are added separately to the liquid to be purified. The liquid is then filtered after a suitable period of time to remove the mineral and adsorbed contaminants. However, there is a danger when using this method that not all the surfactant added will adsorb onto the clay but some will remain in solution thereby contaminating the liquid to be purified.

In a second and preferred embodiment, the mineral substrate is treated with a quaternary ammonium salt and the treated mineral is then contacted with the liquid to be purified. The quaternary ammonium salt that is ion-exchanged on the mineral substrate is extremely difficult to remove by immersion in aqueous or organic liquids. By this method contaminated liquids may be purified without the danger of exchanging one contaminant for another.

In general liquids may be contacted for a time sufficient to remove all or most of the contaminant. The pH of solution should not be too acidic or too basic in order to avoid possible reactions with the mineral such as leaching of alumina or silica. It is preferred to have pH within the range of 3-12, the range 5-9 being especially preferred.

The treated mineral sorbent of the present invention may be prepared by reaction in solution or by direct impregnation by spraying or other suitable technique.

When prepared by reaction in solution, the mineral substrate is added to a stirred solution of dissolved quaternary ammonium salt in water, alcohol or mixtures thereof. Isopropanol is the preferred alcohol. The resulting slurry is mixed for a time sufficient to achieve the desired degree of ion-exchange/adsorption, at which point the treated mineral product is recovered by filtration and drying. If desired the product may also be ground and sized. The concentration of quaternary ammonium salt in solution may vary from 1-50% by weight. The mineral substrate concentration may also vary from 1-50% by weight with 5-30% being the preferred range for ease in mixing. The slurry may be mixed from 1 minute to several days, but generally at least 15 minutes are required, and normally a time of 2-3 hours is sufficient. It is preferred to keep the temperature in the range 20°-100° C., with 40°-80° C. being especially preferred. The drying step should be carried out carefully at low to medium temperatures, for example 20°-150° C. with 60°-100° C. being preferred, so as not to affect the quaternary ammonium salt. Long exposures, e.g. two hours or more, at 100° C. in an atmosphere containing oxygen may be detrimental. The amount of quaternary salt or quaternary cation on the treated mineral product may be determined by LECO carbon analysis familiar to those skilled in the art.

As an alternative, the mineral substrate may be impregnated with the quaternary ammonium salt directly by spraying a solution of the salt onto a tumbling bed of the mineral. Agitation and spraying should be done to achieve a homogenous distribution of surfactant on the mineral and should be carried out at a rate sufficient to maintain a dry and flowable character in the mineral. The mineral thus treated is then dried and optionally ground and sized. With this technique it is essential to add exactly the amount of surfactant desired. The concentration of surfactant in the solution added may be from 1 to 80%, with 20-50% preferred for ease in spraying. The volume of solution added should be less than the available pore volume of the mineral substrate so as not to overwet the mineral and cause clumping and unequal distribution of surfactant. Mixing times should be about 15 minutes, but normally 2-3 hours are sufficient. Temperature ranges and drying conditions are identical to those mentioned previously.

In preparation of these samples it should be noted that the cation exchange capacity of the mineral may often be exceeded so that part of the total quaternary salt is ion-exchanged onto the mineral substrate and part is adsorbed on the surface, so that the term "reaction" is not excactly descriptive of the process but embraces both mechanisms of ion exchange and sorption.

The following examples, not to be construed as limiting, are presented to further illustrate practice of the invention.

EXAMPLE 1

Fifty grams (50 g.) of Varisoft 6112 solution as received (75% active ingredient, 25% isopropanol) was added to a beaker containing 270 ml. water and 30 ml. isopropanol. This solution was stirred and heated to 50°-60° C. on a hot plate before being transferred to a 1-liter 3-neck flask. A water cooled reflux condenser was placed in one neck; a thermometer was immersed in the solution through another neck, and a motor-driven stirring shaft was placed through the central neck. The flask was surrounded by a heating mantle and the solution was stirred. Fifty grams (50 g.) of low volatile matter (LVM) attapulgite clay 100% finer than 325 mesh Tyler was added to the flask and the slurry heated and stirred for two hours at 50°-60° C. This clay originated from the Georgia-Florida area and was calcined to about 5% volatile matter and had a free moisture content of 1-3% as used. The particles were clumps of needle-like attapulgite of highly irregular shape having particle size distribution of about 100% finer than 44 microns, 90% finer than 22 microns, 70% finer than 12 microns, 50% finer than 5.5 microns, 30% finer than 2 microns, and 22% finer than 1 micron, as determined by Sedigraph. Thus these particle sizes are not true particle sizes but equivalent spherical diameter (e.s.d.) sizes. After treatment the slurry was suction filtered through #4 Whatman paper in a Buechner funnel. The filter cake was reslurried once in 200 ml. of a 90% water/10% isopropanol (vol./vol.) solution and re-filtered. The filter cake was washed twice more by reslurrying in 200 ml. aliquots of water and filtering. The filter cake was then transferred to a dish and broken up into small pieces. The sample was dried in a vacuum oven overnight at room temperature and reduced pressure (less than about 5 psia, pounds per square inch absolute). The sample was dried an additional two hours at 73° C. in the oven. Once dry, the sample was sieved to substantially 100% finer than 325 mesh Tyler (44 microns) with a size distribution substantially similar to the starting clay and was ready for use. The final product was analyzed for carbon by the LECO method, well-known in the art. The carbon content was found to be 14.3% by weight, which corresponded to 26.8 millimoles of Varisoft 6112/100 g. treated clay, or 53.6 milliequivalents of Varisoft 6112/100 g. treated clay. The milliequivalents are twice as great as the millimole figure because Varisoft is a di-quaternary compound. On a weight basis this corresponds to roughly 17% quaternary per 100 g. treated clay.

EXAMPLE 2

Five hundred milliliters (500 ml.) of distilled water were placed in a 1-liter 3-neck flask. One hundred grams (100 g.) of the same attapulgite as used in Example 1 were added while the liquid was being stirred at room temperature. After mixing 5–10 minutes 40 ml. of Arquad T-50 solution as is (approximately 49–52% active ingredient, 36% isopropanol and 13% water) was added from a graduated cylinder. The cylinder was rinsed several times with aliquots of water totalling 200 ml., and the rinses were added to the slurry. The mixture was then heated to 50° C. for 45 minutes. The sample was allowed to cool and was then vacuum filtered through #4 Whatman paper. The filter cake was reslurried in 100 ml. of distilled water and refiltered a total of five times. The cake was then broken up into small pieces and dried overnight in a forced air oven at 60° C. After drying the sample was sieved to substantially 100% finer than 325 mesh Tyler before use. The LECO carbon analysis showed 11.6% carbon which corresponded to 47.8 millimoles Arquad T-50/100 g. treated clay or the same number in milliequivalents, since Arquad T-50 has a single quaternary ammonium functionality.

EXAMPLE 3

One hundred and fifty milliliters (150 ml.) of distilled water was added to a 500 ml. resin kettle. While stirring 20 g. of acid-activated bentonite was added. The bentonite was a commercial grade, Filtrol®105, 100% finer than 325 mesh Tyler. An aqueous solution of 35.8 g. cetylpyridinium chloride monohydrate in 50 ml. distilled water was prepared. This solution was added to the bentonite slurry being stirred at room temperature. This mixture was then heated to 81°–82° C. for 2½ hours with continuous stirring. While still warm the sample was vacuum filtered onto #4 Whatman paper, and the filter cake was washed five times with 100 ml. distilled water while still on the paper. The filter cake was dried in air at 110° C. and sieved to 100% finer than 325 mesh Tyler. The product was found to contain 17.3% carbon by LECO carbon analysis. This corresponded to 68.6 meq. surfactant/100 g. treated clay.

EXAMPLE 4

Two hundred sixteen grams (216 g.) of Varisoft 6112 as received (75% active ingredient) was diluted with isopropanol to give a total solution volume of 600 ml. This solution was sprayed onto 500 g. of the same attapulgite as in Example 1. The clay was contained in a rotating can tilted at an angle of about 45 degrees. Four blades axially disposed along the inside wall of the can provided good tumbling and mixing of the clay. About 475 ml. of the diluted surfactant was sprayed as a fine mist onto the clay through an atomizing nozzle operated by a hand pump. The rate of addition during the 1–3 hour mixing time was controlled such that the clay retained a free flowing appearance. The product was dried overnight in a vacuum oven at 60° C. and less than 2 psia. The product was found to contain 12.1% carbon corresponding to 24 millimoles of surfactant/100 g. treated clay, or 48 meq. surfactant/100 g. treated clay.

EXAMPLE 5

Treated clay and other liquid purification sorbents may be evaluated comparatively on the basis of performance in decolorizing molasses solutions. This test is widely recognized by those in the art as being indicative of broad spectrum decolorizing power of a sorbent.

A molasses test solution was prepared by dissolving commercial "blackstrap" molasses (Holiday brand) in distilled water to give a 1.0% by weight buffered solution and filtering the solution through a #4 Whatman paper. The pH of this raw solution was 5.0–5.2. The test solution was buffered by the addition of $Na_3PO_4$ in solution (5.0 g./liter), followed by addition of sufficient $H_3PO_4$ to bring the pH to 6.7. It is preferred to have the pH of solution in the range of 6–8, and especially preferred is 6.5–7.0. The pH affects the intensity of color and must be the same for all samples for accurate comparison.

The sorbents to be tested were ground and sieved to 100% finer than 325 mesh Tyler and weighed into 250 ml. Erlenmeyer flasks fitted with plastic screw caps. One hundred milliliters (100 ml.) of the buffered 1.0% molasses solution were added by pipette into the flasks. The caps were attached securely, and the stoppered flasks were placed in a water-filled shaker bath kept at 90° C. The shaker bath was covered with several layers of polyethylene sheet to minimize heat loss. After one hour of agitation at 90° C., the heating was stopped and the samples were allowed to cool in the bath while agitation continued for another hour. During this time temperature dropped about 20° C. The treated solutions were then filtered through #5 Whatman paper by gravity and sampled for absorbance tests. The absorbance values were measured at a wavelength of 425 nanometers relative to a distilled water sample using a Beckman DU-2 Spectrophotometer. The performance of various sorbents is illustrated in Table I below:

TABLE I

PERFORMANCE OF VARIOUS SORBENTS IN MOLASSES DECOLORIZATION TEST

| Sorbent | Surfactant Loading mmole/100 g. | Relative Efficiency % Decolorization | | |
|---|---|---|---|---|
| | | 50% | 75% | 90% |
| Darco®DC (activated carbon) | — | 100.0 | 100.0 | 100.0 |
| Ambersorb ™ XE-348 (resin) | — | 28.1 | 19.2 | 11.5 |
| LVM attapulgite | 0 | <<0.2 | <<0.3 | <<0.4 |
| Filtrol 105 bentonite | 0 | <<0.2 | <<0.3 | <<0.4 |
| LVM attapulgite/ Arquad T-50 | 7.9 | 1.8 | 0.3 | <0.4 |
| Arquad T-50 | 19.1 | 21.7 | 11.0 | 4.3 |
| | 19.1 | 21.7 | 11.0 | 4.3 |
| | 33.4 | 67.9 | 40.2 | 19.6 |
| Filtrol 105 bentonite/ Arquad 16-50 | 12.6 | <0.2 | <<0.3 | <<0.4 |
| | 32.7 | 10.7 | 3.8 | 0.9 |

TABLE I-continued
PERFORMANCE OF VARIOUS SORBENTS IN MOLASSES DECOLORIZATION TEST

| Sorbent | Surfactant Loading mmole/100 g. | Relative Efficiency % Decolorization | | |
|---|---|---|---|---|
| | | 50% | 75% | 90% |
| | 52.2 | 39.3 | 21.3 | 8.8 |
| | 73.4 | 95.2 | 52.4 | 23.8 |
| Filtrol 105 bentonite/ cetylpyridinium chloride | 72.7 | 114.3 | 63.4 | 27.9 |
| LVM attapulgite/ Arquad 16-50 | 52.2 | 81.0 | 44.5 | 19.0 |

A high-quality activated carbon, Darco DC manufactured by ICI America, Inc. was used as the standard for these tests. The data in Table I show that an untreated minerals such LVM attapulgite, a low volatile matter clay calcined to about 5% volatile matter and 1–3% free moisture, and acid activated bentonite have virtually no decolorizing power. Resin-type sorbents exemplified by Ambersorb XE-348 carbonaceous resin manufactured by Rohm & Haas Co., Philadelphia, Pa., performed less well than activated carbon. Surfactant treated clays have decolorizing ability dependent upon the loading level of surfactant, the substrate, and the nature of the surfactant. In many cases the performance of surfactant-treated clays of the present invention approaches that of activated carbon and in some cases may actually exceed it.

EXAMPLE 6

The use of aqueous bromocresol green to screen sorbents for industrial wastewater treatment has recently been proposed. Reference is made to R. J. Martin et al "SELECTION CRITERIA FOR COMMERCIAL ACTIVATED CARBONS IN WASTEWATER TREATMENT", Abstract from American Chemical Society, 178th National Meeting, Washington, D.C., Sept. 9–14, 1979.

A water solution containing 20 ppm of the bromocresol green was prepared and the pH was buffered to 7.0 using $Na_3PO_4$ and $H_3PO_4$. Dry sorbents in 0.0025, 0.0050, 0.0100 and 0.0200 g. dosages were added to 100 ml. aliquots of the bromocresol green solution in 250 ml. screw-capped Erlenmeyer flasks. The flasks were shaken at ambient temperature (about 30° C.) in a reciprocating shaker bath. Samples were taken at periods of time ranging from 3 minutes to 18.6 hours to test the rate of decolorization. The samples were filtered through #5 Whatman paper and the filtrates analyzed colorimetrically at a wavelength of 615 nanometers with a colorless phosphate-buffered distilled water sample as the reference. The buffered bromocresol green solution by itself would have an absorbance of about 1.0 at 615 nm in a 1 cm. cell. The ultimate performance after 18.6 hours contact time of various sorbents is shown in Table II. At shorter times the treated attapulgite sorbents tended to respond more quickly than activated carbon, giving higher decolorization at the shorter contact time.

TABLE II
PERFORMANCE OF VARIOUS SORBENTS IN BROMOCRESOL GREEN DECOLORIZATION

| Sorbent | Surfactant Loading mmole/100 g. | Relative Efficiency % Decolorization | | |
|---|---|---|---|---|
| | | 50% | 75% | 90% |
| Darco DC | — | 66 | 64 | 57 |
| activated carbon | | | | |
| Nuchar TM WV-W | — | 100 | 100 | 100 |
| activated carbon | | | | |
| LVM attapulgite | 0 | 0 | 0 | 0 |
| LVM attapulgite/ Arquad T-50 | 47.8 | 46 | 45 | 40 |
| | 32.1 | 33 | 31 | 29 |

Nuchar activated carbon manufactured by Westvaco Corporation, New York, N.Y., is an activated carbon designed for water treatment use. It was used as the standard for bromocresol green decolorization. Untreated LVM attapulgite shows no ability to decolorize aqueous bromocresol green solutions, but surfactant treated clay shows decolorization power approaching Darco activated carbon, depending on the loading level of surfactant.

EXAMPLE 7

Decolorization of cane sugar liquor by various sorbents was also investigated. This test is not a laboratory screening test but an actual end-use in which the power of various sorbents to remove color bodies from a solution containing a high concentration of colorless solute (sucrose) is evaluated. Current industrial practice is to decolorize cane sugar liquor by a dual-adsorbent, two-step process. Bone char which is 5–10% activated carbon on a porous calcium phosphate substrate removes the majority of the color and inorganic salts (ash) which are not effectively adsorbed by activated carbon. Additional decolorization is then accomplished by treatment with activated carbon.

A cane sugar liquor already partly decolorized by chemical treatment was obtained from Refined Syrups and Sugars, Inc., Yonkers, N.Y. for use in the tests described hereinafter. This liquor was 60.4 Brix (77.8 g. sucrose per 100 ml. solution) and had an overall brownish hue. Screw cap, 250 ml. Erlenmeyer flasks were charged with dry sorbent in dosages of 0.2, 0.4, 0.8 and 1.6 g. and 130 g. of cane sugar solution was added to each flask. The flasks were then shaken vigorously at 60° C. for 3 hours in a shaker bath. The samples were then cooled to room temperature and pressure filtered through #50 Whatman paper on a Fann Filter Press at 100 psi nitrogen pressure. The filtrates were adjusted to pH 7.0 with 0.1 M HCl or 0.1 M NaOH as required. Color intensities were determined spectrophotometrically as in Example 5 using 1 cm. cuvettes and wavelengths of 420 and 720 nanometers. Water with a pH adjusted to 7.0 by 0.1 M HCl or 0.1 M NaOH was used as the reference sample. The results for various sorbents are shown below in Table III.

TABLE III
PERFORMANCE OF VARIOUS SORBENTS IN CANE SUGAR DECOLORIZATION

| Sorbent | Surfactant Loading mmoles/100 g. | % Decolorization at g sorbent/130 g. sugar liquor | |
|---|---|---|---|
| | | 0.20 g. | 0.80 g. |
| Nuchar 681 activated carbon | — | 41.6 | 82.7 |
| Fresh Bone Char* | — | 33.4 | 72.3 |
| LVM attapulgite/ | 7.9 | 28.7 | 67.5 |

TABLE III-continued

PERFORMANCE OF VARIOUS SORBENTS
IN CANE SUGAR DECOLORIZATION

| Sorbent | Surfactant Loading mmoles/100 g. | % Decolorization at g sorbent/130 g. sugar liquor | |
| --- | --- | --- | --- |
| | | 0.20 g. | 0.80 g. |
| Varisoft 6112 | 26.8 | 65.7 | 75.3 |
| LVM attapulgite/ | 19.4 | 46.4 | 72.5 |
| Arquad T-50 | 32.1 | 58.5 | 81.8 |
| | 47.8 | 68.9 | — |
| LVM attapulgite/ | 13.1 | 32.1 | 64.5 |
| Armac T | 28.2 | 51.0 | 80.0 |
| | 41.2 | 58.8 | 84.4 |

*Bone char of unknown composition obtained from Refined Syrups and Sugars, Inc., Yonkers, New York.

Nuchar 681 is a Westvaco activated carbon impregnated with MgO to keep the liquor pH slightly basic thereby preventing sucrose inversion. The data in Table III show treated attapulgite sorbents perform on a par with activated carbon and bone char depending upon surfactant loading level and type of surfactant. It should be mentioned here that many other commercially available quaternary ammonium surfactants may give similar results. The particular combination of loading level and surfactant most effective for the particular job at hand is best found by experimentation well within the skill of the art. When decolorization data are plotted according to the so-called Freundlich isotherm described in the text by J. W. Hassler, "PURIFICATION WITH ACTIVATED CARBON", Chemical Publishing Company, Inc., New York, N.Y., 1974, pages 52-62; the lines often intersect indicating one loading level may be best to achieve 75% decolorization and a different, lower or higher, loading may be best to achieve 95% decolorization.

I claim:

1. A solid particulate composition comprising particles of attapulgite clay calcined to a volatile matter content of 10 percent by weight or less at a temperature in the range of about 200°-550° C. and having a surface area of about 80-140 m.$^2$/g. as determined by the standard B.E.T. method using nitrogen, a pore volume of about 0.5-0.8 cc./g., and a cationic exchange capacity in the range of 10-40 meq./100 g., said calcined attapulgite clay having been treated with at least one organic substituted quaternary cationic surfactant selected from the group consisting of ammonium, phosphonium and mixtures thereof having at least one organic group of at least four carbon atoms in the amount within the range of about 5-50 meq./100 g. of clay.

2. The composition of claim 1 wherein said surfactant is selected from the group consisting of tallowammonium acetate, cocotrimethylammonium chloride, tallowtrimethylammonium chloride, trimethyl hexadecylammonium chloride, cetyltrimethylammonium bromide, benzyltrimethylammonium chloride, dimethyl dicocoammonium chloride, dimethyldi (hydrogenated tallow) ammonium chloride, methyl-tri ($C_8$-$C_{10}$)-ammonium chloride, tetrapropylammonium chloride, tetrapropylammonium chloride monohydrate, dimethyltallowbenzylammonium chloride, methylbis (2-hydroxy-ethyl octadecylammonium chloride, N,N,N',N',N',-pentamethyl-N-tallow-1, 3-propanediammonium chloride, 1-ethylenebis (2-tallow, 1-methyl, imidazolinium methyl sulfate), methyl-1-tallowamidoethyl-2-tallowimidazolinium methyl sulfate.

3. The composition of claim 1 wherein said surfactant is present in amount within the range of about 15-35 meq./100 g. of said clay.

* * * * *